United States Patent Office 3,010,835
Patented Nov. 28, 1961

3,010,835
LIGHTWEIGHT REFRACTORY CASTABLE AND
METHOD OF MANUFACTURE
Glen W. Charles and Albert R. Lesar, Mexico, Mo., assignors to A. P. Green Fire Brick Company, Mexico, Mo., a corporation of Missouri
No Drawing. Filed Sept. 22, 1958, Ser. No. 762,252
7 Claims. (Cl. 106—40)

The present invention relates generally to the refractory art and more particularly to a novel high temperature lightweight refractory castable and to the method of making same.

There are many different compositions of lightweight refractory castables and methods of making same. Usually lightweight refractory castables are made by compounding a lightweight porous aggregate and a calcium aluminate hydraulic setting cement. If the lightweight refractory castable is installed where it will be exposed to temperatures above 2000° F., the lightweight porous aggregate is made from 2300° F. or 2600° F. insulating firebrick that has been ground to the proper particle size.

Lightweight refractory castables made by following the usual procedure have many disadvantages, the most important of which being that mixtures of lightweight porous aggregates and calcium aluminate cement have a lower maximum use temperature than the original lightweight aggregate. This is believed caused by the fact that a mixture of calcium aluminate cement and the light porous aggregate has a fusion point lower than that of the insulating firebrick aggregate alone. Thus, if a porous aggregate, which when used alone, normally withstands furnace temperatures of 2600° F., is used in combination with calcium aluminate cement, the maximum furnace temperature that the resulting lightweight refractory castable combination can withstand is lower than 2600° F. This is highly undesirable in that it severely limits the type applications wherein lightweight refractory castables can be utilized.

Thus, it is a primary object of the present invention to provide a novel high temperature lightweight refractory castable and method for producing same which is suitable for application in furnaces that operate with maximum temperatures in the range of 2800° F. to 3000° F.

More particularly, it is an object of the present invention to provide a novel lightweight refractory castable that is of such a nature that it can be mixed with water and poured in place using wood or steel forms in a manner similar to pouring ordinary concrete, or it may be installed in the desired location with an air gun in a manner similar to gun placement of concrete.

A further object is to provide a lightweight refractory castable which, after it is installed in a furnace by pouring or by gun application, will exhibit suitable strength, volume stability, and spalling resistance when the furnace is fired at temperatures up to 3000° F.

Briefly, the present invention comprises forming a lightweight refractory castable including a low melting refractory material and a stable non-shrinking highly refractory mixture including a binder. In the preferred composition, the low melting refractory material is expanded perlite, the stable non-shrinking refractory mixture comprises finely ground raw kyanite and finely ground calcined flint fire clay, and the binder is high purity calcium aluminate cement.

We have found that a lightweight refractory castable of suitable strength and superior volume stability, spalling resistance, and refractoriness can be produced by incorporating a low melting porous glassy material in a mixture comprising finely ground raw kyanite, finely ground calcined flint fire clay, and a high purity calcium aluminate cement.

A satisfactory lightweight refractory castable comprises from about 6% to about 12% expanded perlite, from about 53% to about 74% of a stable non-shrinking highly refractory composition, and from about 20% to about 35% high purity calcium aluminate cement as a binder.

More specifically, a lightweight refractory castable composition having the desired characteristics includes from about 6% to about 12% by weight expanded perlite, from about 15% to about 40% by weight of raw kyanite, from about 30% to about 55% by weight of calcined flint fire clay and about 20% to about 35% high purity calcium aluminate cement. This mixture, after molding and firing, will have an alumina content of from about 50% to about 70%.

Another suitable lightweight refractory castable composition wherein different mesh kyanites are combined includes from about 6% to about 12% by weight 10 mesh expanded perlite, from about 5% to about 15% by weight of 35 mesh raw kyanite, from about 10% to about 30% by weight of minus 100 mesh raw kyanite, from about 20% to about 55% by weight of minus 8 mesh calcined flint fire clay, and from about 20% to about 35% calcium aluminate cement.

The preferred low melting refractory material is expanded perlite which is a glass of volcanic origin which contains a small quantity of entrapped water. When the material is heated rapidly to temperatures in the range of 1600 to 2000° F., the perlite softens and the entrapped water is changed to water vapor and attempts to escape. In trying to escape, the water vapor causes bubbles to be formed in the softened perlite resulting in the refractory having a porous cellular structure. A typical chemical analysis of suitable expanded perlite is as follows:

| | Percent |
|---|---|
| SiO | 71.3 |
| $Al_2O_3$ | 13.4 |
| CaO | 1.3 |
| $Fe_2O_3$ | 1.7 |
| MgO | 1.0 |
| $Na_2O$ | 2.9 |
| $K_2O$ | 4.1 |

For best results the expanded perlite should be a 10 mesh material, that is, 90% or more of the material will pass through a 10 mesh screen, and preferably should have a density of about 8.4 to 8.9 pounds per cubic foot. Of the commercial perlites presently available, those having a density in the range of about 8.4 to 8.9 pounds per cubic foot produce the best results in our invention. About 6% to about 12%, by weight, perlite has been found to give optimum results. Based on the use of perlite grains having the aforementioned density, if more than about 12% by weight expanded perlite is used, the refractoriness of the mix is lowered, causing undesirable shrinkage of the castable at about 2800° F. On the other hand, if less than about 6%, by weight, expanded perlite is used in the mix, the castable will not meet the weight requirements for a lightweight refractory castable.

After the lightweight refractory castable materials are mixed dry, water is added and each grain of perlite becomes coated with the highly refractory material and the binder. It is important that the porous glassy material have a stable, non-shrinking highly refractory coating because the perlite melts at high temperatures and the refractory coating must maintain the cellular structure of the castable.

The wet castable is put in place in a furnace (by pouring in a form or by gun application), and the perlite is embedded in a matrix of the highly refractory material. When the furnace is subsequently fired, the perlite melts and becomes fluid. The perlite is adsorbed in and it is possible that it reacts with the highly refractory coating materials so as to cause them to maintain their form. The resulting refractory furnace lining is honeycombed with small cavities or pores giving it a cellular-like quality. The stable highly refractory coating (matrix) prevents the pores of the cellular structure from shrinking and closing up even when the castable is used in furnaces which are operated at temperatures up to 3000° F.

The preferred stable, highly refractory material for forming the coating around the grains of expanded perlite comprises finely ground calcined flint fire clay and finely ground raw kyanite.

A calcined flint fire clay which has been found to be satisfactory for use in our invention has the following typical analysis:

CALCINED FLINT FIRE CLAY

| | Percent |
|---|---|
| $Al_2O_3$ | 44 to 48 |
| $SiO_2$ | 50 to 54 |
| Combined impurities (such as $Fe_2O_3$, $TiO_2$, CaO, MgO, $K_2O$, $Na_2O$) | About 6 |

The calcined flint fire clay should be calcined at approximately 2400° F. to 2600° F. in order to pre-shrink it prior to use in the lightweight refractory castable. Calcined kaolins or kaolinitic type clays are suitable substitutes (in whole or in part) for the calcined flint fire clay preferred in this invention.

Raw kyanites suitable for use in this product are now commercially available from Virginia and South Carolina. A typical chemical analysis of a kyanite suitable for this purpose is as follows:

RAW KYANITE

| | Percent |
|---|---|
| $Al_2O_3$ | 64.0 |
| $SiO_2$ | 28.5 |
| $Fe_2O_3$ | 0.8 |
| $TiO_2$ | 3.0 |
| CaO | 0.8 |
| Alkalies | 0.8 |

A high purity calcium aluminate suitable for use in this type of lightweight castable is commercially available and has the following approximate chemical composition:

CALCIUM ALUMINATE CEMENT

| | Percent |
|---|---|
| Alumina | 83–85 |
| Calcium oxide | 14–16 |
| Impurities | Less than 2 |

It is possible to use calcium aluminate cements with a lower ratio of alumina to calcium oxide; however, it is desirable from a refractoriness standpoint to have the alumina content as high as possible.

It is important that the refractory castable should have a resultant alumina content within the range of about 50% to about 70%. If the alumina content is below about 50%, the castable will not be refractory enough to withstand 2800° F. On the other hand, if the alumina content is above about 70%, the castable will not exhibit the desired volume stability and good spalling resistance. The proper combination of raw kyanite and calcined flint fire clay in the castable is also necessary to insure high strength, spalling resistance, and volume stability at all temperatures up to 3000° F.

*Example I*

An example of a lightweight refractory castable mix suitable for pouring or gunning application to form a lining for a furnace operating at temperatures up to 3000° F. contains the following (expressed in percent of the dry mix weight):

3000° F. LIGHTWEIGHT REFRACTORY CASTABLE

| | Percent |
|---|---|
| Perlite (expanded), 10 mesh | 8 |
| Raw kyanite, 35 mesh | 10 |
| Raw kyanite, 100 mesh | 25 |
| Calcined flint fire clay, 8 mesh | 32 |
| Calcium aluminate cement | 25 |

When water is added to the above mix and it is poured in place, it will have a weight after drying of only 69 to 74 pounds per cubic foot. It will exhibit no appreciable drying or firing shrinkage when used at any temperature up to 3000° F. It has a modulus of rupture in the dried state of about 200 pounds per square inch and a crushing strength of about 450 pounds per square inch. Its pyrometric cone equivalent is 35–36. When it is subjected to the A.S.T.M. 2910° F. spalling test, A.S.T.M. Designation C107–47 Manual of A.S.T.M. Standards on Refractory Materials, p. 38, 1952, it shows less than 2% loss, and when it is subjected to the A.S.T.M. 3000° F. panel spalling test, A.S.T.M. Designation C122–47, p. 40, 1952, it shows less than 15% loss.

When the above mix is applied by means of a cement gun, it will have a weight of approximately 95 pounds per cubic foot. It will exhibit no appreciable drying or firing shrinkage when fired at any temperature up to 3000° F. It has a modulus of rupture of about 375 pounds per square inch and a crushing strength of about 1200 pounds per square inch. The other physical properties are the same as when poured.

*Example II*

An example of a lightweight refractory castable mix suitable for pouring or gunning application and capable of withstanding furnace temperatures up to 2800° F. when used as the furnace lining contains the following (expressed in percent of the dry mix weight):

2800° F. LIGHTWEIGHT REFRACTORY CASTABLE

| | Percent |
|---|---|
| Perlite (expanded), 10 mesh | 10 |
| Raw kyanite, 35 mesh | 15 |
| Calcined flint fire clay, 8 mesh | 40 |
| Calcined flint fire clay, 48 mesh | 15 |
| Calcium aluminate cement | 20 |

When water is added to the preceding mix and it is poured in place, it will have a weight after drying of only 63 to 67 pounds per cubic foot. It will exhibit no appreciable drying or firing shrinkage when used at any temperature up to 2800° F. It has a modulus of rupture in the dried state of about 150 pounds per square inch and a crushing strength of about 300 pounds per square inch.

*Example III*

Another example of a lightweight refractory castable suitable for pouring or gunning application and capable of withstanding furnace temperatures up to 300° F. when used as the furnace lining contains the following (expressed in percent of the dry mix weight):

3000° F. LIGHTWEIGHT REFRACTORY CASTABLE

| | Percent |
|---|---|
| Perlite (expanded), 10 mesh | 6 |
| Raw kyanite, 35 mesh | 15 |
| Raw kyanite, 100 mesh | 25 |
| Calcined flint fire clay, 8 mesh | 30 |
| Calcium aluminate cement | 24 |

The properties on this mix are as follows:

| | | |
|---|---|---|
| Wt. per cubic foot after drying | lbs | 74–79 |
| Modulus of rupture, dried about | p.s.i. | 250 |
| Crushing strength, dried about | p.s.i. | 500 |

Example IV

Another example of a lightweight refractory castable mix suitable for pouring or gunning application and capable of withstanding furnace temperatures up to 2800° F. when used as the furnace lining contains the following (based on percent of the dry mix weight):

2800° F. LIGHTWEIGHT REFRACTORY CASTABLE

| | Percent |
|---|---|
| Perlite (expanded), 10 mesh | 12 |
| Raw kyanite, 100 mesh | 15 |
| Flint fire clay grog, 8 mesh | 38 |
| Calcium aluminate cement | 35 |

The properties of this mix are as follows:

| | | |
|---|---|---|
| Weight per cubic ft. after drying | lbs | 58–63 |
| Modulus of rupture, dried about | p.s.i | 200 |
| Crushing strength, dried about | p.s.i | 450 |

Example V

Another example of a lightweight refractory castable suitable for pouring or gunning application to form a lining for a furnace operating at temperatures up to 3000° F. contains the following (expressed in percent of the dry mix weight):

3000° F. LIGHTWEIGHT REFRACTORY CASTABLE

| | Percent |
|---|---|
| Perlite (expanded), 10 mesh | 8.0 |
| Raw kyanite, 35 mesh | 10.0 |
| Raw kyanite, 100 mesh | 25.0 |
| Calcined flint fire clay, 8 mesh | 29.5 |
| Calcium aluminate cement | 25.0 |
| Calcined alumina (Brand A-1), 325 mesh | 2.5 |

The properties of this mix are as follows:

| | | |
|---|---|---|
| Weight per cubic foot after drying | lbs | 74–79 |
| Modulus of rupture, dried about | p.s.i | 250 |
| Crushing strength, dried about | p.s.i | 500 |

Thus, we have provided a novel lightweight refractory castable and method of making same, which fulfills all the objects and advantages sought therefor. The lightweight refractory castable is suitable for pouring or gunning application to form a lining for furnaces operating with maximum temperatures in the range of 2800° F. to 3000° F. In addition, the lightweight refractory castable exhibits high strength, volume stability, and spalling resistance at temperatures as high as 3000° F.

This invention is intended to cover all changes and modifications of the examples of the invention herein chosen for purposes of the disclosure which do not constitute departures from the spirit and scope of the invention.

What is claimed is:

1. A substantially dry lightweight castable refractory mix consisting essentially of from about 6% to about 12% by weight expanded perlite, from about 15% to about 40% by weight raw kyanite, from about 30% to about 55% by weight of calcined flint fire clay, and from about 20% to about 35% by weight of calcium aluminate cement, said mix being essentially free of raw fire clay and raw kaolins.

2. A lightweight castable refractory mix consisting essentially of from about 6% to about 12% by weight expanded perlite, from about 15% to about 40% by weight raw kyanite, from about 30% to about 55% by weight of calcined fire clay, and from about 20% to about 35% by weight calcium aluminate cement in such proportions as to produce a fired refractory having an alumina content from about 50% to about 70%.

3. A lightweight castable refractory mix which when mixed with water can be applied to a furnace to form a 3000° F. refractory lining therefor consisting essentially of from about 6% to about 12% by weight of 10 mesh expanded perlite, from about 5% to about 15% by weight of 35 mesh raw kyanite, from about 10% to about 30% by weight of minus 100 mesh raw kyanite, from about 30% to about 55% by weight of minus 8 mesh calcined flint fire clay, and from about 20% to about 35% calcium aluminate cement in such proportions as to produce a fired refractory having an alumina content from about 50% to about 70%.

4. A lightweight castable refractory mix consisting essentially of about 8% by weight of 10 mesh expanded perlite, about 10% by weight of 35 mesh raw kyanite, about 25% by weight of minus 100 mesh raw kyanite, about 29.5% by weight of minus 8 mesh calcined flint fire clay, about 25% by weight calcium aluminate cement, and about 2.5% by weight 325 mesh calcined alumina, said mix being essentially free of raw fire clay and raw kaolins.

5. In a furnace, a lightweight refractory lining consisting essentially of from about 6% to about 12% by weight expanded perlite embedded in a stable, non-shrinking refractory matrix including from about 15% to about 40% by weight raw kyanite, from about 30% to about 55% by weight calcined flint fire clay, and from about 20% to about 35% calcium aluminate cement, said mix being essentially free of raw fire clay and raw kaolins.

6. A lightweight castable refractory mix consisting essentially of from about 6% to about 12% by weight expanded perlite, from about 15% to about 40% by weight raw kyanite, and from about 30% to about 55% by weight calcined fire clay selected from the group consisting of calcined kaolin and calcined flint fire clay, and from about 20% to about 35% by weight calcium aluminate cement, said mix being essentially free of raw fire clay and raw kaolins.

7. The method of producing a lightweight cast refractory lining for furnaces operated at temperatures up to about 3000° F. including the steps of combining from about 6% to about 12% by weight 10 mesh expanded perlite, from about 15% to about 40% by weight of raw kyanite, from about 30% to about 55% by weight of calcined fire clay, and from about 20% to about 35% by weight calcium aluminate cement binder, adding water to form a mix of the desired consistency, applying the mix to the furnace wall so as to imbed the perlite particles in the refractory matrix, and firing the refractory to a temperature to cause the perlite to melt and form pores in the lining.

References Cited in the file of this patent

UNITED STATES PATENTS

| 2,043,249 | Jones | June 9, 1936 |
| 2,207,992 | Steele | July 16, 1940 |
| 2,246,226 | Walton | June 17, 1941 |
| 2,558,782 | Ratcliffe | July 3, 1951 |
| 2,793,128 | Emhiser | May 21, 1957 |
| 2,911,311 | Feagin | Nov. 3, 1959 |
| 2,912,341 | Ricker | Nov. 10, 1959 |
| 2,963,377 | Renkey | Dec. 6, 1960 |

OTHER REFERENCES

Lea and Desch: "The Chemistry of Cement and Concrete," published, 1956, Great Britain, by Butler and Tanner Ltd., pages 501 and 502.

UNITED STATES PATENT OFFICE
CERTIFICATE OF CORRECTION

Patent No. 3,010,835                              November 28, 1961

Glen W. Charles et al.

It is hereby certified that error appears in the above numbered patent requiring correction and that the said Letters Patent should read as corrected below.

Column 2, line 24, for "20%" read -- 30% --; column 4, line 60, for "300° F." read -- 3000° F. --.

Signed and sealed this 15th day of May 1962.

(SEAL)
Attest:

ERNEST W. SWIDER                          DAVID L. LADD
Attesting Officer                            Commissioner of Patents